(12) United States Patent
Colin

(10) Patent No.: US 6,216,543 B1
(45) Date of Patent: Apr. 17, 2001

(54) METHOD AND DEVICE FOR CONTROLLING LIQUID FLUXES IN PIPES LINES

(75) Inventor: Bruno Colin, Marcy l'Etoile (FR)

(73) Assignee: Bio Merieux, Marcy l'Etoile (FR)

( * ) Notice: Subject to any disclaimer, the term of this patent is extended or adjusted under 35 U.S.C. 154(b) by 0 days.

(21) Appl. No.: 09/180,926

(22) PCT Filed: Mar. 27, 1998

(86) PCT No.: PCT/FR98/00638

§ 371 Date: Dec. 7, 1998

§ 102(e) Date: Dec. 7, 1998

(87) PCT Pub. No.: WO98/44290

PCT Pub. Date: Oct. 8, 1998

(30) Foreign Application Priority Data

Mar. 28, 1997 (FR) .................................................. 97 04171

(51) Int. Cl.⁷ ..................................................... G01F 1/708
(52) U.S. Cl. ............................................................. 73/861.05
(58) Field of Search ........................... 73/861.05, 861.06, 73/861.08, 861.04, 861.07

(56) References Cited

U.S. PATENT DOCUMENTS

| | | | |
|---|---|---|---|
| 3,605,741 | * | 9/1971 | Spencer .............................. 73/861.05 |
| 3,722,276 | * | 3/1973 | Chandler et al. ................. 73/861.07 |
| 5,741,979 | * | 4/1998 | Arndt et al. ...................... 73/861.05 |
| 5,932,813 | * | 8/1999 | Swartzel et al. .................. 73/861.05 |

* cited by examiner

*Primary Examiner*—Harshad Patel
(74) *Attorney, Agent, or Firm*—Oliff & Berridge, PLC

(57) ABSTRACT

A flow monitoring method and device including introducing at at least a point in a pipeline at least one detectable body carried by the flow of liquid. A stationary detector for detecting the passage of the detectable body, wherein, the detectable body contains an electronic chip associated with an antenna, for being detected by electromagnetic method. The antenna at least transmits a signal to and receives a signal from the stationary detector. An interceptor for intercepting the detectable body at at least a point in the pipeline.

33 Claims, 2 Drawing Sheets

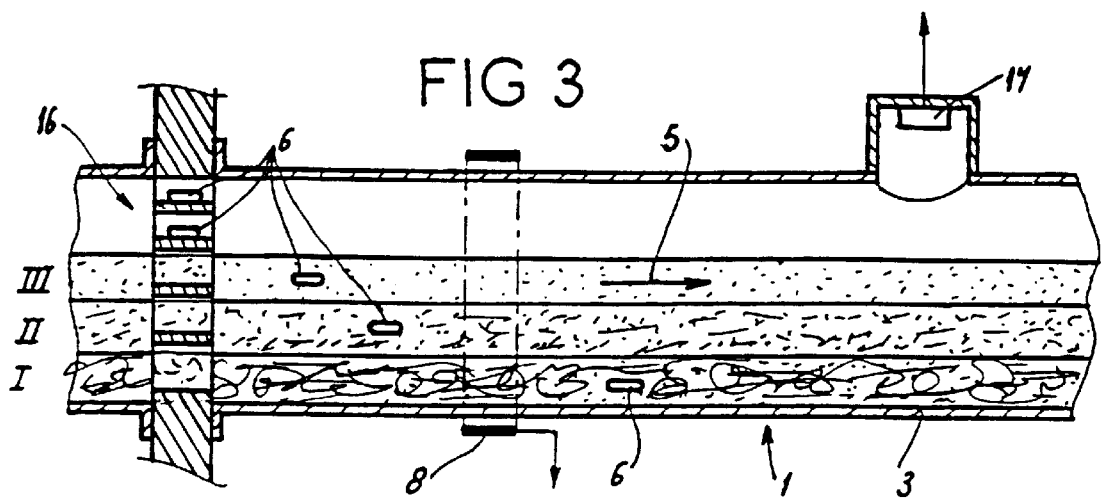
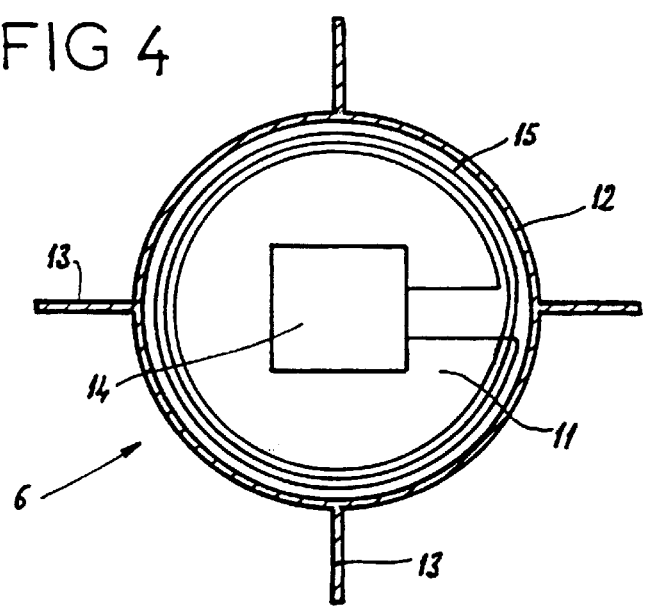

METHOD AND DEVICE FOR CONTROLLING LIQUID FLUXES IN PIPES LINES

The present invention relates to a method and to a device for monitoring at least one flow of liquid in at least one pipeline and mainly (although not exclusively) for monitoring flows of liquids in networks of pipelines. This invention is more particularly although not exclusively of use for monitoring the flow of water in drinking water mains. It can also be applied to the monitoring of flows of water in sewerage systems.

Good management of water distribution networks requires sufficiently precise knowledge about the way the water flows through the various main and secondary branches of these networks. In the case of drinking water mains, it is necessary, in particular, to detect zones of stagnation or of low water flowrates which cause a deterioration in the water quality, so that these zones can be eliminated as far as possible.

To perform this kind of monitoring, a certain number of constraints need to be taken into consideration. Firstly, given that these are generally underground networks of pipelines, direct visual monitoring of the flow of water can be excluded right from the outset. Furthermore, the use of "labels" which are colored, or are of any danger whatsoever to the end user, must also be avoided. Furthermore, the fitting of meters and flowmeters at numerous points in a water distribution network is not economically viable.

Certain methods and devices for monitoring the flow of liquids are known, but they are not suited to networks of the kind considered here.

Thus, document GB 2197719A describes a system for measuring the flowrate of fluid in a pipeline, comprising injecting a radioactive "label" into the pipeline and detecting the passage of this label. This system is applied to underwater oil lines, and anticipates the injection into the oil line, at regular points in time, of small amounts of seawater irradiated by a radioactive source. For obvious reasons, such a system, which is after all complicated and expensive, is inacceptable in the case of drinking water mains.

Documents EP 0100304A and US 5311781A disclose systems for monitoring flows of liquids, which systems are based on detecting the movement of objects such as air bubbles or particles in suspension, included in the liquid and carried along by it. Such systems assume the "natural" presence of air bubbles or other detectable particles in the liquid, which makes their operation somewhat haphazard, if not impossible, in the case of a practically pure liquid such as drinking water. Furthermore, detecting small-sized objects such as air bubbles and particles in suspension presents a certain amount of difficulty and requires costly apparatuses. Finally, as air bubbles and other particles cannot be individually identified and recognized from one point in a network or pipeline to another, these known systems merely allow the speed and flowrate of a liquid to be measured locally but are unable to be used to monitor the flow and distribution of a liquid in a network that has many branches.

Finally, documents GB 1245479A and DE 2525937A describe devices for introducing spherical bodies into these pipelines. These bodies have a diameter equal to that of the pipeline, and cannot therefore be used in networks which contain pipelines of varying diameters. In the case of document GB 1245479A, the ultimate purpose of the spherical bodies is not specified, but in any case these bodies are not associated with any means of detecting their passage. In the case of document DE 2525937A, the spherical body comes into sealed contact with the wall of the pipeline, in order to separate two separate liquids flowing in turn in the same pipeline, and its purpose is therefore not to monitor the flow of liquid, even though it contains a permanent magnet that allows its location to be identified. In this respect, it should also be pointed out that a simple magnet does not allow a body to be individually identified from among a number of bodies.

The present invention aims to solve these problems by providing a method and a device which are simple, economical and harmless, suited to monitoring a flow of liquid in a pipeline or flows of liquids in networks of pipelines, such as drinking water mains.

To this end, the subject of the invention is essentially a method for monitoring one or more flow(s) of liquids in a pipeline or a network of pipelines, which consists, in a given network or pipeline, in introducing, at at least one point of the pipeline or of the network, at least one or more relatively small-sized detectable bodies which can be carried along by the flow of liquid toward the various parts of the pipeline or of the network concerned, and in detecting the passage of said detectable body or bodies at at least one or more predetermined point(s) of the pipeline or of the network considered.

Thus, the principle of the invention consists in introducing, into one or more flow(s) of liquids, one or more bodies which are carried along by this or these flows and which are automatically detected as they pass one or more predetermined points, thus making it possible to acquire knowledge about their path and speed. In particular, a zone reached by only very few of said bodies, or in which these bodies progress at a very low speed, can be identified as a stagnation zone.

The method that is the subject of the invention advantageously further comprises the operation which consists in intercepting said detectable body or bodies at at least one point of the pipeline or of the network concerned, and in extracting this or these bodies from the pipeline or from the network, particularly so as to prevent these bodies from blocking small cross section branches of the network or from reaching the end user. In addition, recovering said body or bodies allows the option of reusing it/them.

As a preference, the detectable body or bodies is/are detected electromagnetically. Said body or bodies can be detected through the walls of the pipeline or pipelines, particularly in the case of pipelines that are made of a synthetic substance. In the case of metallic pipelines, which may act as obstacles to the transmission of electromagnetic waves, said body or bodies may be detected inside the pipeline or pipelines, for example at individual points of a network, particularly at the valves.

According to a simple embodiment, detection is performed "passively", that is to say that the passage of the detectable body or bodies at a certain number of points is detected simply by identifying these bodies which provide a "signature" as they pass a detector.

According to another, more refined embodiment, detection is performed "actively", that is to say that the detectable body or bodies is/are designed to receive and store information as it/they pass(es) predetermined points of the pipeline or of the network and to restore this information as it/they pass(es) another point or other points, or accumulate this information and restore it only after it/they has/have been recovered at the end of its/their path through the pipeline or through the network.

Depending on the situation, the information obtained from detecting the passage of said body or bodies at one or more predetermined points of the pipeline or of the network may be processed in real time by a computer system or be stored for later processing.

Another subject of the present invention is a device for monitoring a flow or flows of liquids in a pipeline or in a network of pipelines with a view to implementing the above-defined method.

The device in question is essentially made up, on the one hand, of at least one relatively small-sized detectable body and, on the other hand, of at least one stationary detector placed at a predetermined point of the pipeline or network concerned, and capable of cooperating with the aforementioned detectable body.

In a preferred embodiment of the device, the detectable body, which has impervious walls, contains an electronic "chip" associated with a transmitting and/or receiving antenna, the stationary detector being capable of cooperating with the electronic "chip" and the antenna of said detectable body.

In the simplest configuration, the detectable body has no source of power, such as a battery. In an alternative, this detectable body has an on-board source of electrical power, such as a battery, which allows it to be detected at a longer range, which may be as much as several meters; the latter arrangement is therefore advantageous in the case of a large cross section pipeline.

As a preference, the detectable body has a mean mass per unit volume substantially equal to that of the liquid flowing in the pipeline or network concerned, for example a density of the order of 1 in the case of a water distribution network. Thus, this detectable body can "float within the body of the body", so that it can be carried along appropriately by any flow of liquid.

The detectable body is externally in the shape of a disk or pellet or is alternatively spherical in shape, giving the overall appearance of a bead or small bore. Advantageously, this detectable body has fins on the outside which stabilize it, encourage it to be carried along by the flow of liquid, and protect its sensitive parts.

The detectable body may have an essentially hollow configuration, and be bounded by a casing which is not only impervious but also able to withstand the pressure of the liquid flowing in the pipeline or network concerned. As an alternative, this detectable body has a solid structure, with a mass per unit volume that is adapted to that of the liquid flowing in the pipeline or network concerned. Advantageously, said detectable body is produced, at least at the surface, with a material that is soft or elastic enough that it will not damage the walls of the pipeline or pipelines in the event of an impact.

The electronic "chip" included in the detectable body fulfills the functions of providing electrical power, identification and coding, according to generally known techniques, and makes this body individually identifiable. In the case of a detectable body in the shape of a disk, pellet or sphere, this electronic "chip" is placed substantially at the center of said body, while the antenna, needed for transmitting and receiving signals exchanged with the stationary detector or detectors, is formed by a number of turns of electrically conducting wire wound in the form of a coil and installed in the peripheral region of the detectable body.

The stationary detector or detectors, which may be arranged particularly at the valve or valves of the pipeline or of the network concerned, are advantageously connected to a computerized central management system.

The device may also comprise, in order to form a complete system:

- at least one piece of equipment for distributing the detectable bodies, this piece of equipment being designed to introduce these bodies into the pipeline or network and being situated at a point close to the primary source from which the pipeline or network is drawn, and/or
- at least one piece of equipment for intercepting and extracting said detectable bodies, this piece of equipment being situated, for example, at a point of the pipeline or network that is close to an end user.

The invention will be better understood with the aid of the description which follows, with reference to the appended diagrammatic drawing which depicts, by way of examples, a number of embodiments of this device for monitoring flows of liquids in networks of pipelines:

FIG. 3 illustrates the application of the device that is the subject of the invention to a sewerage system;

FIG. 4 is a detailed view, in section, of a detectable body.

Figure 1:
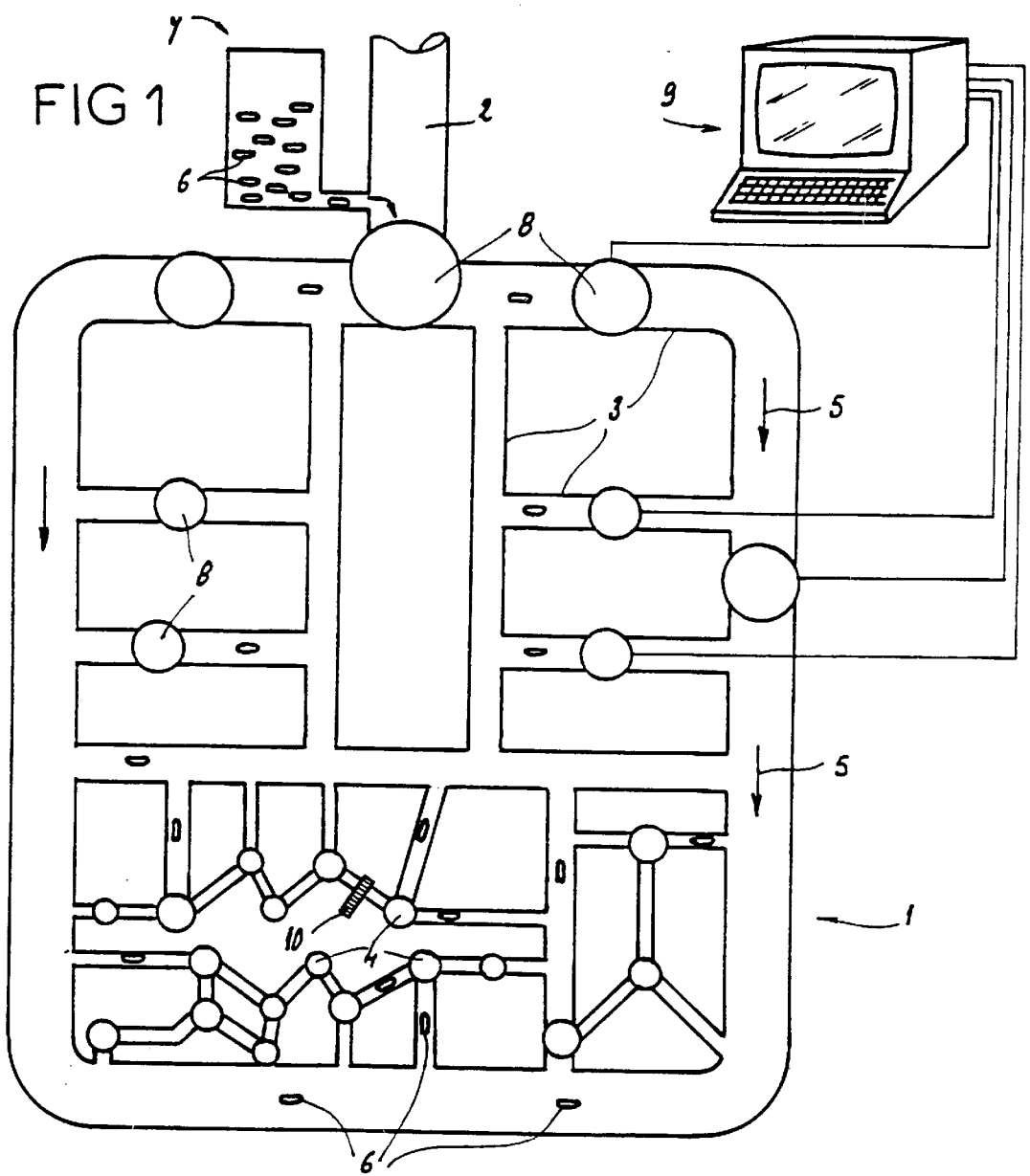
FIG. 1 is a highly diagrammatic overall view of a network of pipelines that is equipped with the device that forms the subject of the present invention.

FIG. 1 depicts, very diagrammatically, a network of pipelines denoted overall by the reference 1, such as a drinking water main. As is generally known, the network 1 comprises a primary source 2 from which the liquid is drawn, and main and secondary pipelines 3 in the form of loops and/or ramifications, ending at a certain number of end users 4 situated within a certain perimeter, for example an urban area.

To monitor the flows of water, as indicated by arrows 5, in the pipelines 3 of the network 1, the invention anticipates introducing into this network 1 detectable bodies 6 and detecting the passage of said bodies 6 at predetermined points of the network 1.

Figure 2:
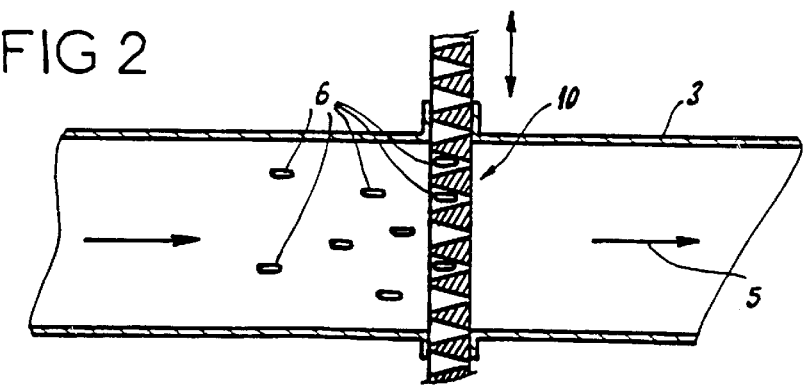
FIG. 2 is a detail view, showing a piece of equipment for intercepting and extracting the detectable bodies.

To achieve this, the device depicted diagrammatically in FIG. 1 comprises:

- a piece of equipment 7 for distributing the detectable bodies 6, this piece of equipment being situated at the primary source 2 from which the liquid is drawn;
- a collection of stationary detectors 8, arranged on the pipelines 3 at predetermined points and connected to a central computer system 9;
- pieces of equipment 10 for intercepting and extracting the detectable bodies 6, each of these pieces of equipment 10 being situated at a point of the network 1 that is close to an end user 4 and possibly being in the form of a mobile interception and extraction grating allowing the flow of water 5 to pass along the pipeline 3 concerned but arresting the bodies 6 which reach them (see also FIG. 2).

As FIG. 4 shows, each detectable body 6 has, in the example considered, the overall shape of a hollow sphere. The body 6 thus has a cavity 11 bounded by a spherical casing 12 which is impervious and can withstand the water pressure, provided with several stabilizing fins 13 on the outside.

Arranged at the center of the cavity 11 of the body 6 is an electronic "chip" 14 which fulfills the functions of providing electrical power, identification and coding. Associated with the "chip" 14 is an antenna 15 formed by several turns of wire wound into an annular coil, which are installed just under the spherical casing 12 of the body 6.

The mean density of the detectable bodies 6 is substantially equal to 1, therefore to the density of water, which means that these bodies 6 can remain supported in the water in the network 1.

The detectable bodies 6 thus formed are introduced one by one into the network 1, by means of the piece of distribution equipment 7, and find themselves carried along by the flows of water 5 in the pipelines 3. The passage of these bodies 6 past the various detectors 8 is detected electromagnetically, it being possible for the information relating to the passage of a body 6 past a detector 8 to be transmitted immediately to the central computer system 9. Insofar as the detectable bodies 6 are identifiable, and as the times at which these bodies 6 pass the detectors 8 are determined, it is possible to acquire knowledge about the flows of water 5 from the point of view of their path and their speed, and thus identify any undesirable zones in which the water in the network 1 is stagnating.

Intercepting and extracting the detectable bodies 6 using the pieces of equipment 10 prevents these bodies 6 from reaching the end user 4 and allows these bodies 6 to be recovered, particularly when their "chip" 14 is used to record, on its path, information that is to be restored only at the end of the path. Of course, the characteristics of the recovery and extraction grating need to be adapted to the size and quantity of detectable bodies 6 used.

FIG. 3 illustrates the application of the invention to a sewerage system 1, just one pipeline 3 (which may also be known by the name of "sewer") of which has been partially depicted. The foul water passing along this pipeline 3 does not fill its entire cross section and may reach various levels as indicated as I, II and III. Sludge may also build up at the bottom of the pipeline 3, for example up to level I. Arranged at a predetermined point of this pipeline 3 is a support 16 capable of retaining and of holding in readiness several detectable bodies 6 (as previously described) placed at different heights from one another, each body 6 being individually identifiable. Depending on the level I, II or III reached by the foul water, the detectable bodies 6 will be selectively released from the support 16 and carried along by the flow 5, and may be identified as they pass at least one detector 8 placed on the pipeline 3 downstream of the support 16. There may also be arranged on this pipeline 3 at least one olfactory sensor 17, connected to a central monitoring station. These devices make it possible to keep track of the behavior of the sewerage system 1, under various weather and/or pollution conditions, here too detecting stagnant zones, and doing so while avoiding human inspections inside the pipelines 3.

More particularly, the olfactory sensor 17 arranged on the pipeline 3 is designed to detect any pollution in the sewerage system 1 and, if such a detection is made, to trigger the release of at least one detectable body 6 so as to follow the progress of the pollution and/or channel it. In particular, the pollution thus detected and followed may be channelled down a preferred path, through a suitable operation of the valves of the network.

It will also be noted that, in the context of an application to a sewerage system, it may be advantageous to use detectable bodies 6 with varying degrees of weighting or buoyancy. Thus, it is possible to use certain detectable bodies 6 which have a density of the order of 1.1 which will be carried along by the sludge, and other detectable bodies 6 which have a density of the order of 0.9 which, on the other hand, will accompany the surface flow, this making it possible to differentiate between the flows at the various levels as indicated as I, II and III.

The following would not constitute a departure from the scope of the invention:

modifying the exterior shape of the detectable body or bodies which could also have a flat disk or pellet shape or alternatively could have an elongate shape;

making this or these detectable body or bodies not hollow, but solid, provided that their density remains close to that of the liquid passing through the pipeline or network considered;

intending this device not for networks or pipelines through which water flows, but instead for networks or pipelines through which other liquids flow, such as hydrocarbons networks for petroleum or chemical plant;

applying the invention to networks in which the pipelines may be of all types, the term "pipelines" denoting both pipes and conduits which are open to the air, such as channels and gulleys.

What is claimed is:

1. A method for monitoring a flow of liquid in at least one pipeline, comprising:

introducing, at at least one point of the at least one pipeline, at least one detectable body inside the at least one pipeline carried along by the flow of liquid toward a plurality of points of the at least one pipeline;

detecting the passage of the at least one detectable body at at least one predetermined point of the plurality of points of the at least one pipeline;

intercepting the at least one detectable body at at least one point of the plurality of points of the at least one pipeline; and extracting the at least one detectable body from the at least one pipeline.

2. A method according to claim 1, wherein the at least one detectable body is detected electro-magnetically.

3. A method according to claim 2, wherein the at least one detectable body is detected through a wall of the at least one pipeline.

4. A method according to claim 1, wherein said at least one detectable body is detected inside the at least one pipeline at individual points of the plurality of points of the at least one pipeline.

5. A method according to claim 1, wherein detection is performed by identifying a signature of the at least one detectable body as it passes at least one detector.

6. A method according to claim 1, wherein the at least one detectable body receives and stores information as it passes the at least one predetermined point of the at least one pipeline and at least one of: (a) restores the information as it passes other points of the plurality of points; and (b) accumulates the information as it passes the other points of the plurality of points and restores the information after it has been recovered at the end of a path through the at least one pipeline.

7. A method according to claim 6, wherein the information obtained from detecting the passage of said at least one detectable body at the at least one predetermined point of the at least one pipeline is processed in real time by a computer.

8. A method according to claim 1, wherein the at least one pipeline is formed of a synthetic material.

9. A method according to claim 1, wherein the at least one pipeline is formed of metal.

10. A method according to claim 1, wherein the at least one pipeline includes a network of pipelines.

11. A method according to claim 10, wherein the network of pipelines is a sewerage system.

12. A method according to claim 1, wherein the at least one pipeline is a water main.

13. A device for monitoring flow of liquid in at least one pipeline, employing the method according to claim 1, comprising:

at least one detectable body inside the at least one pipeline; and at least one stationary detector, placed at at least one predetermined point of the at least one pipeline, that detects the at least one detectable body, wherein the at least one detectable body includes an impervious casing and an electronic chip including an antenna, the antenna at least one of transmitting signals to and receiving signals from the at least one stationary detector.

14. A device according to claim 13, wherein the at least one detectable body has no source of electrical power.

15. A device according to claim 13, wherein the at least one detectable body has an on-board source of electrical power.

16. A device according to claim 15, wherein the on-board source of electrical power is a battery.

17. A device according to claim 13, wherein the at least one detectable body has a mean density substantially equal to that of the liquid flowing in the at least one pipeline.

18. A device according to claim 13, wherein the at least one detectable body is externally in the shape of at least one of a disk, a pellet, and a sphere.

19. A device according to claim 13, wherein the at least one detectable body has at least one stabilizing fin on the outside.

20. A device according to claim 13, wherein the at least one detectable body has a cavity and is bounded by the impervious casing which is able to withstand the pressure of the liquid flowing in the at least one pipeline.

21. A device according to claim 13, wherein the at least one detectable body has a solid structure.

22. A device according to claim 21, wherein the at least one detectable body has a density greater than the density of the liquid flowing in the at least one pipeline.

23. A device according to claim 21, wherein the at least one detectable body has a density that is less than the density of the liquid flowing in the at least one pipeline.

24. A device according to claim 21, wherein the at least one detectable body has a density equal to the density of the liquid flowing in the at least one pipeline.

25. A device according to claim 13, wherein the at least one detectable body includes, at least at an outer surface, a material that is softer than the walls of the at least one pipeline.

26. A device according to claim 13, wherein the electronic chip is placed substantially at the center of the at least one detectable body and the antenna is formed by a number of turns of electrically conducting wire wound in the form of a coil and installed in a peripheral region of the at least one detectable body.

27. A device according to claim 13, wherein the at least one stationary detector is in communication with a computer.

28. A device according to claim 13, further comprising:

at least one distributor that distributes the at least one detectable body and introduces the at least one detectable body into the at least one pipeline; and at least one extractor that intercepts and extracts said at least one detectable body from the at least one pipeline.

29. A device according to claim 28, wherein the at least one distributor is situated at a point adjacent to a primary source front which the at least one pipeline draws liquid.

30. A device according to claim 28, wherein the at least one extractor is situated at a point adjacent to an end user of the at least one pipeline.

31. A device according to claim 13, wherein the at least one pipeline is a sewerage network in which the sewerage may reach a plurality of levels within the at least one pipeline, the device further comprising:

at least one support upstream of the at least one stationary detector, the at least one support retains and holds a plurality of detectable bodies placed at different heights from one another, each height corresponding to a level of the plurality of levels, each detectable body having an individual signature and being selectively released from the at least one support and carried along by the flow depending on the level reached by the sewerage, and being identified as it passes the at least one stationary detector placed downstream of the at least one support.

32. A device according to claim 31, further comprising:

at least one olfactory sensor arranged on the at least one pipeline that detects any pollution in the at least one pipeline, and, if such a detection is made, triggers the release of at least one detectable body so as to follow the progress of the pollution and channel the pollution.

33. A device according to claim 31, further comprising:

at least one olfactory sensor arranged on the at least one pipeline that detects any pollution in the at least one pipeline, and, if such a detection is made, triggers the release of at least one detectable body so as to follow the progress of the pollution.

* * * * *